United States Patent [19]
Alberts et al.

[11] 4,360,635
[45] Nov. 23, 1982

[54] THERMOPLASTIC MOULDING COMPOSITIONS OF CELLULOSE ESTER GRAFT COPOLYMERS OR MIXTURES THEREOF WITH CELLULOSE ESTERS

[75] Inventors: Heinrich Alberts; Winfried Fischer, both of Cologne; Christian Leuschke, Dormagen; Herbert Bartl, Odenthal, all of Fed. Rep. of Germany

[73] Assignee: Bayer Aktiengesellschaft, Leverkusen, Fed. Rep. of Germany

[21] Appl. No.: 215,939

[22] Filed: Dec. 12, 1980

[30] Foreign Application Priority Data

Dec. 21, 1979 [DE] Fed. Rep. of Germany ....... 2951748
Dec. 21, 1979 [DE] Fed. Rep. of Germany ....... 2951800

[51] Int. Cl.$^3$ .................... C08L 51/00; C08F 291/06
[52] U.S. Cl. .............................. 525/54.45; 525/54.21; 525/54.23; 525/54.3; 526/238.21; 527/311; 527/313; 527/314
[58] Field of Search .... 260/17 A, 17.4 GC, 17.4 UC, 260/17.4 CL; 525/54.21, 54.23, 54.3, 54.45; 526/238.21; 527/300, 311, 314, 313

[56] References Cited

U.S. PATENT DOCUMENTS

| | | | |
|---|---|---|---|
| 2,787,602 | 4/1957 | Groves | 260/17 |
| 3,088,791 | 5/1963 | Cline et al. | 260/17.4 GC |
| 3,645,939 | 2/1972 | Gaylord | 260/17.4 GC |
| 3,682,850 | 8/1972 | Coates | 260/17 R |
| 4,267,090 | 5/1981 | Heimberg et al. | 260/17.4 ST |

*Primary Examiner*—John Kight, III
*Assistant Examiner*—Nathan M. Nutter
*Attorney, Agent, or Firm*—Connolly and Hutz

[57] ABSTRACT

Transparent thermoplastic moulding compositions having improved mechanical properties consist of graft copolymers or mixtures thereof with a cellulose ester of aliphatic $C_1$–$C_5$ carboxylic acids, wherein the graft copolymers consist of an ethylene vinyl ester copolymer and a cellulose ester of aliphatic $C_1$–$C_5$-carboxylic acids as the graft substrate, at least part of which being bridged with polymerized grafted units of vinyl esters and/or alkyl esters of acrylic and/or methacrylic acid, and, optionally, $C_2$–$C_4$-olefins.

7 Claims, No Drawings

THERMOPLASTIC MOULDING COMPOSITIONS OF CELLULOSE ESTER GRAFT COPOLYMERS OR MIXTURES THEREOF WITH CELLULOSE ESTERS

This invention relates to thermoplastic moulding compositions of graft copolymers obtained by polymerizing vinyl monomers, particularly unsaturated esters, in the presence of mixtures of cellulose esters and ethylene/vinyl ester copolymers, and also to mixtures of these graft copolymers with cellulose esters.

Moulding compositions of cellulose acetate cannot be subjected to thermoplastic processing without the addition of plasticisers because this ester begins to decompose before softening. The softening and decomposition temperatures of cellulose acetopropionates and acetyobutyrates also lie so close to one another that these moulding compositions also have to be mixed with plasticisers before thermoplastic processing. This enables the necessary reduction in the processing temperature and processing viscosity to be obtained.

The plasticizers used for organic cellulose esters are primarily aliphatic esters of phthalic acid, adipic acid, azelaic acid, sebacic acid and phosphoric acid, such as dimethyl phthalate, diethyl phthalate, dibutyl adipate, dioctyl adipate, dibutyl azelate, trichloroethyl phosphate and tributyl phosphate. In many cases, it is also advantageous to use plasticiser mixtures.

Although the cellulose ester moulding compositions modified with plasticisers are highly transparent, it would be desirable further to improve the dimensional stability to heat thereof for certain applications. In addition, the plasticisers gradually migrate to the surface of the mouldings so that, for example, films of modified cellulose esters cannot be used for packing certain foods.

German Auslegeschrift No. 1,303,219 describes mixtures of organic cellulose esters, low molecular weight plasticisers and olefin polymers. However, in view of the relatively high content of olefin polymers thereof, such moulding compositions are no longer transparent. In addition, conventional low molecular weight esters are used in this case as platicisers with all the well-known disadvantages which this involves.

The use of polymeric plasticisers for cellulose mixed esters is also known. U.S. Pat. No. 3,682,850 describes a thermoplastic mixture of from 40 to 90%, by weight, of cellulose esters and from 10 to 60%, by weight, of an ethylene/vinyl acetate copolymer having a vinyl acetate content of from 75 to 99%, by weight, which are characterised by good mechanical strength values and high transparency.

In addition, transparent thermoplastic moulding compositions of organic cellulose esters and ethylene/vinyl ester copolymers are known from German Offenlegungsschrift No. 2,426,178. The ethylene/vinyl ester copolymers used contain from 30 to 98%, by weight, preferably from 60 to 98%, by weight of incorporated vinyl ester.

Although mixtures of cellulose mixed esters and ethylene/vinyl ester copolymers containing less than 75%, by weight, of incorporated vinyl ester in the ethylene copolymer component are generally transparent, they show an increasing tendency towards crazing under flexural or tensile stressing with an increasing content, by weight, of the ethylene/vinyl ester copolymer in the mixture.

This reduction in transparency is undesirable for certain applications. The inadequate compatibility of the polymers also makes it difficult to produce soft, flexible moulding compositions which are required to show high transparency without crazing, even under extreme tensile or flexural stressing.

It has now been found that the disadvantages referred to above may be obviated and highly transparent, soft and flexible moulding compositions based on organic cellulose esters and ethylene/vinyl ester copolymers containing up to 75%, by weight, of incorporated vinyl ester may be obtained by grafting vinyl monomers, preferably vinyl esters and acrylic esters or mixtures thereof, onto mixtures of organic cellulose esters and ethylene/vinyl ester polymers as the graft base or by mixing the thus-obtained graft copolymers with further cellulose esters. As a result of grafting, the polymers of the graft base are also completely or partly bridged with one another.

Accordingly, the present invention relates to thermoplastic moulding compositions consisting essentially of:

(1) from 1 to 99%, by weight, preferably from 15 to 85%, by weight, of a graft base consisting of:
  (a) from 1 to 99%, by weight, preferably from 20 to 95%, by weight, of an ethylene/vinyl ester copolymer containing from 5 to 75%, by weight, preferably from 25 to 55%, by weight, of incorporated vinyl ester; and
  (b) from 99 to 1%, by weight, preferably from 80 to 5%, by weight, of a cellulose ester of one or more aliphatic $C_1$–$C_5$ carboxylic acids; and polymerized units of:
(2) from 99 to 1%, by weight, preferably from 85 to 15% by weight, of one or more vinyl esters and/or alkyl esters of acrylic and/or methacrylic acid; and
(3) from 0 to 20%, by weight, of one or more $C_2$–$C_4 \alpha$-olefins; at least part of the ethylene/vinyl ester copolymer and the cellulose ester being bridged with one another through polymerized units of the graft monomers and the sums of components (1) to (3) and (a) and (b) amounting each to 100%, by weight.

The present invention also relates to thermoplastic moulding compositions consisting essentially of:

(I) from 1 to 99%, by weight, preferably from 50 to 99%, by weight, of a cellulose ester of one or more aliphatic $C_1$–$C_5$ carboxylic acids; and
(II) from 99 to 1%, by weight, preferably from 50 to 1%, by weight, of a graft copolymer consisting of:
  (1) from 1 to 99%, by weight, preferably from 15 to 85%, by weight, of a graft base consisting of:
    (a) from 1 to 99%, by weight, preferably from 20 to 95%, by weight, of an ethylene/vinyl ester copolymer containing from 5 to 75%, by weight, preferably from 25 to 55%, by weight, of incorporated vinyl ester; and
    (b) from 99 to 1%, by weight, preferably from 80 to 5%, by weight, of a cellulose ester of one or more aliphatic $C_1$–$C_5$ carboxylic acids; and polymerized units of
  (2) from 99 to 1%, by weight, preferably from 85 to 15%, by weight, of one or more vinyl esters and/or alkyl esters of acrylic and/or methacrylic acid; and
  (3) from 0 to 20%, by weight, of one or more $C_2$–$C_4 \alpha$-olefins; at least part of the ethylene/vinyl ester copolymer and the cellulose ester in component (II) being bridged with one another through polymerized units of the graft monomers and the sums of components (I) and (II), (1) to (3) and (a) and (b) amounting each to 100%, by weight.

Suitable cellulose esters for producing the moulding compositions according to the present invention are cellulose esters of aliphatic carboxylic acids containing from 1 to 5 carbon atoms, preferably cellulose acetate, cellulose acetopropionate and cellulose acetobutyrate.

The processes for producing organic cellulose esters have long been known and are described, for example, in Ullmanns Encyklopädie der technischen Chemie (Verlag Urban and Schwarzenberg, München-Berlin, 1963), Vol. 5, pages 182 to 201.

Preferred cellulose acetobutyrates contain:
from 40 to 50%, by weight, of butyric acid groups and
from 15 to 26%, by weight, of acetic acid groups.

Cellulose acetobutyrates having the following composition are particularly preferred for the moulding compositions according to the present invention:
from 42 to 46%, by weight, of butyric acid groups and
from 18 to 22%, by weight, of acetic acid groups.

Preferred cellulose acetopropionates generally contain
from 50 to 66%, by weight, of propionic acid groups
and from 1 to 12%, by weight, of acetic acid groups,
whilst particularly preferred cellulose acetopropionates have the following composition:
from 54 to 66%, by weight, of propionic acid groups
and
from 4 to 9%, by weight, of acetic acid groups.

Of the cellulose acetates, it is preferred to use secondary cellulose acetates.

As measured at 20° C., the relative viscosities ($\eta_{rel}$) of 2%, by weight, solutions in acetone of the aliphatic cellulose esters used are from 2.5 to 6.0, preferably from 3.5 to 5.0.

The cellulose esters used for producing the graft copolymers generally correspond in composition to the cellulose esters used for producing the mixtures, although it is, of course, also possible to use cellulose esters other than those present in the graft copolymer for producing the mixtures.

The ethylene/vinyl ester copolymers are produced by known methods of high-pressure or medium-pressure synthesis in bulk, solution or emulsion.

Suitable vinyl esters are organic vinyl esters of saturated, optionally halogen-substituted, particularly chlorine-substituted, aliphatic monocarboxylic acids containing from 1 to 18 carbon atoms or aromatic monocarboxylic acids containing from 7 to 11 carbon atoms, such as vinyl formate, vinyl acetate, vinyl propionate, vinyl chloropropionate, vinyl butyrate, vinyl isobutyrate, vinyl caproate, vinyl laurate, vinyl myristate, vinyl stearate and vinyl benzoate, preferably vinyl acetate.

The ethylene/vinyl ester copolymers produced by the high-pressure synthesis process have melt index values (as measured in accordance with DIN 53 735 at 190° C. under a load of 2.16 kp) of from 0.1 to 100, preferably from 1.0 to 10, more particularly from 3.5 to 6. The intrinsic viscosities, as measured in tetralin at 120° C., are generally from 0.6 to 1.5 [dl/g]. The molecular weights determined by the light scattering method are preferably from 50,000 to 1,000,000. The inconsistency factor U defined in accordance with the relation $M_w/M_n$-1 (G. Schulz, A. phys. Chem. (B) 43 (1939), pages 25 to 34) is from 5 to 30. These copolymers are soluble in hydrocarbons or alcohols.

The ethylene/vinyl ester copolymers containing from 5 to 75%, by weight, preferably from 25 to 55%, by weight, of vinyl ester, produced, for example, by solution or emulsion polymerization have melt index values (190° C./2.16 kp) which may be greater than 100, although the melt index range is preferably below 15, more particularly from 0.5 to 5. The molecular weights as measured by the light scattering method are preferably from 40,000 to 1,000,000. The inconsistency factor U is from 1 to 15. The copolymers are soluble in hydrocarbons and alcohols and preferably have intrinsic viscosities ($\eta$) of from 0.5 to 2.5 [dl/g] in toluene.

The monomers used for producing the graft copolymers are primarily vinyl esters and/or alkyl esters of (meth)acrylic acid. Suitable esters are the $C_1-C_{14}$, preferably $C_1-C_4$, alkyl esters of acrylic and/or methacrylic acid, such as methyl(meth)acrylate, ethyl(meth)acrylate, n-propyl- and isopropyl(meth)acrylate, n-butyl- and isobutyl(meth)acrylate and 2-ethyl hexyl(meth)acrylate. Suitable vinyl esters are the above-described vinyl esters of aliphatic or aromatic monocarboxylic acids, preferably vinyl acetate.

Other suitable monomers are $C_2-C_4\alpha$-olefins, such as ethylene, propylene and isobutylene, and optionally acrylic acid and methacrylic acid.

Unless transparent graft copolymers are required, it is also possible to use aromatic vinyl compounds, such as styrene or $\alpha$-methyl styrene, optionally in admixture with the (meth)acrylic esters.

The graft polymerization reaction is carried out in solution or in bulk. Suitable solvents are hydrocarbons, such as benzene, toluene, xylene, alcohols, such as methanol, ethanol, propanol, isopropanol, n-butanol, t-butanol or mixtures thereof with water, chlorinated hydrocarbons, such as chlorobenzene, methylene chloride, tetrachloroethylene, methyl acetate, ethyl or butyl acetate and glacial acetic acid or mixtures thereof.

The graft bases may be dissolved in known manner in the solvent system selected. It is, of course, possible initially to prepare a solution of one graft base, subsequently to dissolve the second polymer in the resulting solution or in a solvent which is miscible with the first solvent, then to combine the two mixtures and to use the thus-obtained homogeneous solution for the grafting reaction. The graft polymerization reaction is preferably carried out in homogeneous phase, although in principle it may also be carried out in heterogeneous phase. It is also readily possible initially to prepare a homogeneous phase from the graft base, the vinyl monomers and, optionally, the solvent, to disperse the resulting solution in water and then to carry out the polymerisation reaction, optionally after the addition of a catalyst. Polymerization may be carried out continuously or in batches.

The graft reaction may also be carried out in the presence or absence of solvents in polymerization screws and the solvent or the residual monomers may be evaporated off from the graft polymerization mixture in evaporation screws, thin-layer evaporators or spray dryers.

The polymerization reaction is carried out at temperatures of from $-20°$ to $+250°$ C., preferably from $+30°$ to $+180°$ C., and under pressures of from normal pressure to 300 bars, preferably up to 25 bars.

The polymerization catalysts may be added to the polymerization mixture before, during or after the dissolving or mixing operation. The catalysts are preferably introduced into the reaction mixture together with or separately from the monomers after preparation of the homogeneous graft base solution.

The polymerization catalysts are preferably used in a quantity of from 0.001 to 2%, by weight, based on the sum of graft base and graft monomers. These quantities may, of course, be considerably exceeded.

Suitable polymerization catalysts are per-compounds or azo-compounds or radical-yielding highly substituted ethane derivatives, such as benzpinacol. Examples of suitable catalysts are: benzoyl peroxide, t-butyl perpivalate, lauroyl peroxide, t-butyl peroctoate, t-butyl perbenzoate, di-t-butyl peroxide, t-butyl perisononanate, diisopropyl percarbonate, dicyclohexyl percarbonate, dicumyl peroxide, t-butyl perneodecanoate, azo-bis-isobutyronitrile or esters of azo-bis-isobutyric acid, such as the bis-ethyl ester thereof.

Initiator radicals may also be generated by known redox systems or even by UV-radiation, actinic light or accelerated electrons.

During the polymerization reaction, the monomers used are grafted both onto the cellulose ester and also onto the ethylene/vinyl ester copolymer to form graft copolymers which are cross-bridged through polymerized units of the monomers.

This cross-bridging is verified by polymeranalytical studies of the graft polymers (cf. Example 1 in the experimental section). This novel cross-bridging of the starting polymers which, basically, have a tendency to separate is a plausible explanation of the extraordinarily high compatibility which the graft copolymers have been found to show.

The mixtures may be prepared in known manner by dissolving and working-up the solution by precipitation and drying or by evaporating off the solvents through evaporation screws, thin-layer evaporators, tubular coil evaporators or spray dryers. The mixtures may also be prepared in the melt on mixing rolls, in screw extruders or in kneaders.

The moulding compositions according to the present invention may optionally be modified with low molecular weight plasticisers.

Suitable low molecular weight plasticisers are dimethyl phthalate, diethyl phthalate, triphenyl phosphate, methyl ethylene glycol phthalate, dibutyl sebacate, ethyl butylene glycol phthalate, butyl butylene glycol phthalate, dibutyl phthalate, dioctyl adipate, dioctyl phthalate, butyl benzyl phthalate and triacetin.

In addition, the moulding compositions according to the present invention may contain additives, for example to colour and pigment the polymer mixtures to improve the stability thereof to oxidation or light or to reduce the inflammability thereof.

The moulding compositions according to the present invention of graft copolymers of ethylene/vinyl ester copolymers and organic cellulose esters show a remarkable increase in notched impact strength as measured in accordance with DIN 53 543. In addition, they are distinguished by improved dimensional stability to heat, as measured, for example, in accordance with DIN 53 460 as the Vicat softening temperature. The Vicat softening temperatures are up to 50° C. higher than the softening temperatures of the cellulose esters modified with low molecular weight plasticisers.

In addition, the moulding compositions according to the present invention, show improved mechanical properties in relation to these conventional cellulose ester moulding compositions, such as increases in hardness, tensile strength, flexural strength and elasticity modulus.

The known effect of so-called "plasticiser migration" does not occur in the graft copolymers of organic cellulose esters, ethylene/vinyl ester copolymers and vinyl monomers or in the mixtures of these graft copolymers with other organic cellulose esters, so that moulding compositions of the type in question are also particularly suitable, for example, for applications involving contact with foods.

The moulding compositions according to the present invention may readily be processed continuously and in batches in known extruders and injection-moulding machines and, in this respect, show good flow properties.

It is possible to produce shaped articles of various kinds and also acetate rayon, block acetate, film supports for safety films, electrical insulating films and lacquers.

The improved resistance of the products to hot air and ageing also enables them to be used for external facings.

The present invention is illustrated by the following Examples in which the percentages quoted always represent percent, by weight.

EXAMPLE 1

900 g of a cellulose acetopropionate containing 57.5%, by weight, of propionic acid groups and 5.5%, by weight, of acetic acid groups, 900 g of an ethylene/vinyl acetate copolymer (EVA) containing 45% of incorporated vinyl acetate and having a Mooney viscosity of 20, 2500 g of vinyl acetate, 13,500 g of t-butanol and 0.75 g of t-butyl perpivalate are introduced under nitrogen into a 40 liter autoclave which is equipped with an anchor stirrer and with facilities for introducing various solutions and of which the internal temperature may be controlled carefully through a heating/cooling jacket system. The contents of the autoclave are heated to 70° C. and then stirred for 1 hour at that temperature. The addition of 2 solutions is then commenced.

Solution 1: 5600 g of vinyl acetate

Solution 2: 24 g of t-butyl perpivalate in 4000 g of t-butanol

Solutions 1 and 2 are simultaneously introduced over a period of 4 hours. This is followed by stirring for 3 hours at 70° C. and then for 1 hour at 80° C. The mixture is run off while still hot and 500 g of a 5% solution of 2,6-di-t-butyl-p-cresol are added thereto. The graft copolymer is isolated by concentration by evaporation in an evaporation screw. The product has an intrinsic viscosity [$\eta$] of 0.96 [dl/g]. Its chemical composition is as follows:

12% of cellulose acetopropionate,

12% of EVA,

76% of polymerized units of vinyl acetate

A moulded panel produced from the graft polymer at 170° C./200 bars pressure is highly transparent, soft, flexible and does not show crazing under tensile stressing.

A glass transition temperature is measured at +23° C. and represents the main softening range of the sample. A further glass transition is observed at about −35° C. and may be associated with the EVA component.

To study the structure of the graft polymer, the graft product obtained was subjected to fractionation. To this end, the product was fractionated at 25° C. with the separating liquids dimethyl formamide/methyl cyclohexane[1]. The results are set out in the following Table.

(1) cf. R. Kuhn, Makromol. Chem. 177 (1976) 1525-1547.

|  | %, by weight | Oxygen %, by weight | [η] | $\frac{\epsilon\ (2.85\ \mu)}{\epsilon\ (6.95\ \mu)}$ |
| --- | --- | --- | --- | --- |
| upper phase | 37.2 | 31.3 | 1.71 | 0.130 |
| lower phase | 62.8 | 37.0 | 0.88 | 0.075 |

|  | Appearance | %, by weight, of the cellulose ester coupled with EVA |
| --- | --- | --- |
| upper phase | cloudy | 51 |
| lower phase | clear | — |

The lower phase contains ungrafted cellulose ester and ungrafted polyvinyl acetate, whilst the upper phase contains EVA and cellulose ester coupled with EVA through polymer bridges. Evaluation of the analytical data obtained showed that 51% of the cellulose ester used is cross-bridged ("coupled") with the EVA used through vinyl acetate bridges.

EXAMPLE 2

2000 g of t-butanol, 300 g of cellulose acetobutyrate containing 45% of butyric acid groups and 19% of acetic acid groups, 300 g of EVA containing 45% of incorporated vinyl acetate and 400 g of vinyl acetate are heated under nitrogen to 70° C. When a homogeneous solution has formed from the components, a solution of 3 g of t-butyl perpivalate in 1000 g of t-butanol is added over a period of 2 hours. This is followed by stirring for 2 hours at 70° C. and then for 1 hour at 80° C. The volatile fractions are then stripped off in an evaporation screw. The graft polymer is glass-clear and may be processed to form dry, elastic films. The intrinsic viscosity [η], as measured in tetrahydrofuran, amounts to 0.82 [dl/g]. The composition of the graft polymer is as follows:
30.5% of EVA,
30.5% of cellulose acetobutyrate,
39% of polymerized units of vinyl acetate.

The graft polymer is subjected to a shear modulus measurement (measuring frequency approximately 1 Hz). The following glass transitions are observed:
$T_{g1} = -32°$ C. (pure EVA approximately $-25°$ C.),
$T_{g2} = +27°$ C. (polyvinyl acetate phase) and
$T_{g3}$ = approximately 65° C.

EXAMPLE 3

2000 g of t-butanol, 500 g of water, 300 g of cellulose acetobutyrate, 300 g of EVA containing 45% of incorporated vinyl acetate and 600 g of vinyl acetate are heated to 80° C. in a 6-liter reactor. 4.5 g of t-butyl perpivalate in 1000 g of t-butanol are added to the homogeneous solution over a period of 3 hours. This is followed by stirring for 1 hour. The volatile fractions are stripped off in an evaporation screw. The product has an intrinsic viscosity of [η] of 0.84 [dl/g] and contains 26% of EVA, 26% of cellulose acetobutyrate and 48% of polymerized units of vinyl acetate. A moulded panel produced from the product is soft, flexible and transparent.

EXAMPLE 4

2.6 g of t-butyl perpivalate in 200 g of t-butanol are added over a period of 2 hours at 70° C. to a solution of 100 g of cellulose acetobutyrate, 100 g of EVA containing 45% of incorporated vinyl acetate in 1500 g of t-butanol and 900 g of ethyl acrylate. This is followed by stirring for 3 hours at 70° C. and for 1 hour at 80° C. The graft polymer is isolated by precipitation in hot water. 1038 g of a graft product consisting of 9.25% of EVA, 9.25% of cellulose acetobutyrate and 81.5% of polymerized units of ethyl acrylate are obtained after drying. The intrinsic viscosity in tetrahydrofuran [η] amounts to 1.31 [dl/g].

EXAMPLE 5

Using a twin-reactor installation for continuous polymerization (two 5-liter reactors), polymerization is carried out in accordance with the following procedure at a reaction temperature of 70° C. The following solutions are introduced hourly into the first reactor:
Solution 1: 0.221 kg of cellulose acetobutyrate, 0.442 kg of EVA containing 45% of incorporated vinyl acetate, 0.354 kg of vinyl acetate and 2.482 kg of t-butanol After an average residence time of from 40 to 45 minutes in the first reactor and after an average monomer conversion of about 85% has been reached, the polymer syrup is introduced into the second reactor. The average residence time in the second reactor is about 40 minutes. The monomer conversion after leaving the second reactor amounts to virtually 100%. The polymer syrup is worked-up in an evaporation screw.

The graft product has an intrinsic viscosity [η] of 1.65 [dl/g] and consists of 11.1% of cellulose ester, 22.2% of EVA and 66.7% of polymerized units of vinyl acetate. The product may be processed to form highly transparent, tough and elastic mouldings.

EXAMPLE 6

2.25 g of t-butyl perpivalate in 50 g of vinyl acetate and 200 g of t-butanol are added over a period of 2 hours at 75° C. to a solution of 150 g of EVA containing 45% of incorporated vinyl acetate, 500 g of cellulose acetopropionate, 150 g of vinyl acetate and 2000 g of t-butanol. This is followed by stirring for 2 hours at 75° C. The graft product is isolated by precipitation in water, the volatile fractions are stripped off and the polymer is dried. The graft product contains 19% of EVA, 63% of cellulose acetopropionate and 18% of polymerized units of vinyl acetate. The intrinsic viscosity [η] in tetrahydrofuran amounts to 1.2 [dl/g].

EXAMPLE 7

A solution of 14,200 g of t-butanol, 2130 g of EVA containing 45% of incorporated vinyl acetate, 2130 g of cellulose acetopropionate and 800 g of vinyl acetate is heated to 70° C. in a 40-liter autoclave. A solution of 7100 g of t-butanol, 975 g of vinyl acetate and 21.4 g of t-butyl perpivalate is then added over a period of 2 hours at 70° C., followed by stirring for 1 hour at 80° C. 15 g of 2,6-di-t-butyl-p-cresol are then added to the mixture which is then freed from volatile fractions in an evaporation screw. The graft polymer obtained has an intrinsic viscosity [η] of 1.6 [dl/g] and contains 35.25% of EVA, 35.25% of cellulose acetopropionate and 29.5% of polymerized units of vinyl acetate.

EXAMPLE 8

A solution of 2.25 g of t-butyl perpivalate in 200 g of t-butanol is introduced over a period of 2 hours at 70° C. into a solution of 500 g of cellulose acetobutyrate, 150 g of EVA containing 45% of incorporated vinyl acetate, 150 g of vinyl acetate and 200 g of t-butanol. This is followed by stirring for 5 hours at 70° C. The graft product is isolated by precipitating the solution in water, and is washed with water on rolls and dried at 70° C. in a vacuum drying cabinet. The product has an intrinsic viscosity [$\eta$] in tetrahydrofuran of 1.46 [dl/g] and contains 18.5% of EVA, 62.5% of cellulose acetobutyrate and 19% of polymerized units of vinyl acetate. A moulded panel produced from the graft produce (20 minutes at 170° C./200 bars pressure) is transparent and flexible and does not show crazing under flexural and tensile stressing. The following glass transitions are observed during shear modulus measurement on this moulded panel (measuring frequency approximately 1 Hz):

$Tg_1 = -27°$ C. (EVA), $Tg_2 = 52°$ C. (mixed phase of vinyl acetate-coupled cellulose ester and EVA), $Tg_3 = +95°$ C. (cellulose acetobutyrate).

EXAMPLE 9

300 g of EVA containing 45% of incorporated vinyl acetate, 300 g of a cellulose acetate containing 54% of acetic acid groups and 800 g of methyl acrylate are heated to 80° C. in 2000 g of dioxane in a 6-liter reactor. A solution of 4.5 g of t-butyl perpivalate in 1000 g of dioxane is then added over a period of 3 hours. After stirring for 1 hour, 5 g of 2,6-di-t-butyl-p-cresol are added to the mixture, after which the graft product is isolated by precipitation. The graft product has an intrinsic viscosity [$\eta$] in THF of 0.58 [dl/g] and consists of 27.6% of cellulose acetate, 27.6% of EVA and 44.8% of polymerized units of methyl acrylate. The graft product is characterised by a polymer analysis in the same way as described in Example 1. The results show that 44% of the cellulose acetate used is coupled with EVA polymer through methacrylate bridges.

EXAMPLE 10

0.75 g of t-butyl perpivalate is added to a solution of 900 g of cellulose acetopropionate, 900 g of EVA containing 45% of incorporated vinyl acetate, 2500 g of vinyl acetate and 13,500 g of t-butanol in a 40 liter reactor, followed by heating to 70° C. The following solutions are then added over a period of 4 hours:

Solution 1: 5600 g of vinyl acetate, 400 g of ethylene from a pressure vessel,

Solution 2: 24 g of t-butyl perpivalate in 4000 g of t-butanol.

After additional stirring for 3 hours at 70° C., 25 g of 2,6-di-t-butyl-p-cresol are added to the mixture which is then worked-up in an evaporation screw. The reaction product has an intrinsic viscosity [$\eta$] of 1.02 [dl/g] and consists of 9.95% of EVA, 9.95% of cellulose acetopropionate, 3.5% of polymerized units of ethylene and 76.6% of polymerized units of vinyl acetate.

EXAMPLE 11

A solution of 1575 g of cellulose acetopropionate, 4680 g of EVA containing 45% of incorporated vinyl acetate, 1000 g of vinyl acetate and 13,500 g of t-butanol is heated to 110° C. in a 40-liter reactor. A solution of 1700 g of vinyl acetate, 15 g of benzoyl peroxide and 4000 g of t-butanol is then added over a period of 3 hours, followed by stirring for 3 hours at 110° C. 18 g of 2,6-di-t-butyl-p-cresol are added to the mixture which is then worked-up in an evaporation screw. The vinyl acetate conversion amounts to 96%. The graft copolymer consists of 52.9% of EVA, 17.8% of cellulose acetopropionate and 29.3% of polymerized units of vinyl acetate. It has an intrinsic viscosity [$\eta$] of 1.38 [dl/g].

The graft copolymers having the composition indicated in Table 1 below are produced by the method described in Example 1:

TABLE 1

| Example No. | %, by weight EVA | Cellulose acetobutyrate | Cellulose acetopropionate | Vinyl acetate | Methyl acrylate | n-butyl acrylate |
|---|---|---|---|---|---|---|
| 12 | 23.7 | — | 23.7 | 36.8 | — | 15.8 |
| 13 | 30 | 30 | — | 40 | — | — |
| 14 | 21.5 | 21.5 | — | 57 | — | — |
| 15 | 11 | 11 | — | — | 78 | — |
| 16 | 37.5 | 12.5 | — | 50 | — | — |
| 17 | 23 | 12 | — | 65 | — | — |
| 18 | 45 | — | 15 | 40 | — | — |
| 19 | 44.5 | — | 5.5 | 50 | — | — |
| 20 | 45 | — | 15 | 20 | — | 20 |
| 21 | 12.5 | 37.5 | — | 50 | — | — |

PRODUCTION OF MIXTURES

EXAMPLES 22 TO 23

Cellulose acetobutyrate containing 45% of butyric acid groups and 19% of acetic acid groups is intensively mixed at 170° C. on mixing rolls with the quantities of graft copolymers indicated in Table 2, the sum of both components amounting to 100%.

The rough sheets are granulated and subsequently injection-moulded at a melt temperature of 230° C. to form test specimens.

The symbols used in Tables 2 and 3 have the following meanings:

$a_n$ = impact strength according to DIN 53 453 in [kJ/m$^2$]

$a_k$ = notched impact strength according to DIN 53 453 in [kJ/m$^2$]

Vicat = softening temperature in °C. according to DIN 53 460, method B, force 49.05[N]

$H_k30$ = ball indentation hardness after 30 s according to DIN 53 456 in [N/mm$^2$].

TABLE 2

| Example No. | Graft copolymer | [%][a] | $a_n$ [kJ/m$^2$] room temperature | −40° C. | $a_k$ [kJ/m$^2$] | Vicat [°C.] | $H_k^{30}$ [N/mm$^2$] |
|---|---|---|---|---|---|---|---|
| 22 | 1 | 10 | ub.[b] | 78.5 | 2.4 | 98 | 84 |

TABLE 2-continued

| Example No. | Graft copolymer | [%][a] | $a_n$ [kJ/m²] room temperature | −40° C. | $a_k$ [kJ/m²] | Vicat [°C.] | $H_k{}^{30}$ [N/mm²] |
|---|---|---|---|---|---|---|---|
| 23 | 12 | 10 | ub.[b] | ub.[b] | 4.2 | 108 | 74 |
| 24 | 13 | 20 | 76 | 60 | 4.2 | 106 | 78 |
| 25 | 14 | 20 | 78 | 70 | 3.4 | 105 | 84 |
| 26 | 15 | 10 | 68 | 62 | 2.2 | 101 | 76 |
| 27 | 16 | 10 | ub.[b] | ub.[b] | 4.9 | 108 | 75 |
| 28 | 17 | 10 | 85 | 79 | 2.8 | 103 | 82 |
| 29 | 18 | 10 | ub.[b] | 86 | 6.0 | 107 | 70 |
| 30 | 19 | 10 | ub.[b] | ub.[b] | 8.0 | 107 | 72 |
| 31 | 20 | 10 | ub.[b] | 62-ub.[b] | 6.4 | 102 | 62 |
| 32 | 21 | 10 | ub.[b] | ub.[b] | 3.3 | 111 | 78 |

[a] based on the polymer mixture
[b] unbroken

EXAMPLES 33 TO 40

Cellulose acetopropionate containing 57.5% of propionic acid groups and 5.5% of acetic acid groups is intensively mixed at 170° C. on mixing rolls with the quantities of graft polymers indicated in Table 3, the sum of the components amounting to 100%.

The rough sheets are granulated and subsequently injection-moulded at a melt temperature of 230° C. to form test specimens.

TABLE 3

| Example No. | Graft copolymer | [%][a] | $a_n$ [kJ/m²] room temperature | −40° C. | $a_k$ [kJ/m²] | Vicat [°C.] | $H_k{}^{30}$ [N/mm²] |
|---|---|---|---|---|---|---|---|
| 33 | 1 | 10 | 83 | 59 | 2.6 | 109 | 102 |
| 34 | 12 | 10 | 91 | 76 | 4.4 | 123 | 84 |
| 35 | 13 | 20 | 83 | 65 | 2.9 | 115 | 90 |
| 36 | 14 | 20 | 78 | 58 | 2.9 | 114 | 95 |
| 37 | 16 | 10 | 98 | 70 | 4.5 | 122 | 86 |
| 38 | 18 | 10 | 80-ub.[b] | 78 | 5.3 | 122 | 82 |
| 39 | 19 | 10 | 90 | 71 | 5.5 | 127 | 84 |
| 40 | 21 | 10 | ub.[b] | 80-ub.[b] | 3.3 | 128 | 92 |

[a] based on the polymer mixtures
[b] unbroken

We claim:
1. Thermoplastic moulding compositions consisting essentially of:
(1) from 1 to 99%, by weight, of a graft base consisting of:
 (a) from 1 to 99%, by weight, of an ethylene/vinyl ester copolymer containing from 5 to 75%, by weight, of incorporated vinyl ester; and
 (b) from 99 to 1%, by weight, of a cellulose ester of one or more aliphatic $C_1$–$C_5$ carboxylic acids; and graft polymerized units of:
(2) from 99 to 1%, by weight, of one or more vinyl esters and/or alkyl esters of acrylic and/or methacrylic acid; and
(3) from 0 to 20%, by weight, of one or more $C_2$–$C_4\alpha$-olefins; at least part of the ethylene/vinyl ester copolymer and the cellulose ester being bridged with one another through polymerized units of the graft monomers and the sums of components (1) to (3) and (a) and (b) amounting each to 100%, by weight.

2. Thermoplastic moulding compositions as claimed in claim 1 consisting essentially of:
(1) from 1 to 99%, by weight, of a graft base consisting of:
 (a) from 1 to 99%, by weight, of an ethylene/vinyl acetate copolymer containing from 5 to 75%, by weight, of incorporated vinyl acetate; and
 (b) from 99 to 1%, by weight, of a cellulose ester of one or more aliphatic $C_1$–$C_5$ carboxylic acids; and polymerized units of:
(2) from 99 to 1%, by weight, of vinyl acetate and/or one or more $C_1$–$C_4$ alkyl esters of acrylic and/or methacrylic acid; and
(3) from 0 to 20%, by weight, of one or more $C_2$–$C_4\alpha$-olefins; the sums of components (1) to (3) and (a) and (b) amounting each to 100%, by weight.

3. Thermoplastic moulding compositions as claimed in claim 1 or 2 consisting essentially of:
(1) from 15 to 85%, by weight, of a graft base consisting of:
 (a) from 20 to 95%, by weight, of an ethylene/vinyl acetate copolymer containing from 25 to 55%, by weight, of incorporated vinyl acetate; and
 (b) from 80 to 5%, by weight, of a cellulose ester of one or more aliphatic $C_1$–$C_5$ carboxylic acids; and polymerised units of:
(2) from 85 to 15%, by weight, of vinyl acetate and/or one or more $C_1$–$C_4$ alkyl esters of acrylic and/or methacrylic acid; and
(3) from 0 to 20%, by weight, of one or more $C_2$–$C_4\alpha$-olefins; the sums of components (1) to (3) and (a) and (b) amounting each to 100%, by weight.

4. Thermoplastic moulding compositions consisting essentially of:
(I) from 1 to 99%, by weight, of a cellulose ester of one or more aliphatic $C_1$–$C_5$ carboxylic acids; and
(II) from 99 to 1%, by weight, of a graft copolymer consisting of:
 (1) from 1 to 99%, by weight, of a graft base consisting of:
  (a) from 1 to 99%, by weight, of an ethylene/vinyl ester polymer containing from 5 to 75%, by weight, of incorporated vinyl ester; and (b) from 99 to 1%, by weight, of a cellulose ester of one or more aliphatic $C_1$–$C_5$ carboxylic acids; and polymerized units of:

(2) from 99 to 1%, by weight, of one or more vinyl esters and/or alkyl esters of acrylic and/or methacrylic acid; and (3) from 0 to 20%, by weight, of one or more $C_2$–$C_4$ $\alpha$-olefins; at least part of the ethylene/vinyl ester copolymer and the cellulose ester in component (II) being bridged to one another through polymerized units of the graft monomers and the sums of components (I) and (II), (1) to (3) and (a) and (b) amounting each to 100% by weight.

5. Thermoplastic moulding compositions as claimed in claim 4 containing as component (II) a graft copolymer consisting of:

(1) from 1 to 99%, by weight, of a graft base consisting of:
  (a) from 1 to 99%, by weight, of an ethylene/vinyl acetate copolymer containing from 5 to 75%, by weight, of incorporated vinyl acetate; and
  (b) from 99 to 1%, by weight, of a cellulose ester of one or more aliphatic $C_1$–$C_5$ carboxylic acids; and polymerized units of:

(2) from 99 to 1%, by weight, of vinyl acetate and/or one or more $C_1$–$C_4$ alkyl esters of acrylic and/or methacrylic acid; and (3) from 0 to 20%, by weight, of one or more $C_2$–$C_4$ $\alpha$-olefins; the sums of components (1) to (3) and (a) and (b) amounting each to 100%, by weight.

6. Thermoplastic moulding compositions as claimed in claims 4 or 5 containing as component (II) a graft copolymer consisting of:

(1) from 15 to 85%, by weight, of a graft base consisting of:
  (a) from 20 to 95%, by weight, of an ethylene/vinyl acetate copolymer containing from 25 to 55%, by weight, of incorporated vinyl acetate; and
  (b) from 80 to 5%, by weight, of a cellulose ester of one or more aliphatic $C_1$–$C_5$ carboxylic acids; and polymerized units of (2) from 85 to 15%, by weight, of vinyl acetate and/or one or more $C_1$–$C_4$-alkyl esters of acrylic and/or methacrylic acid; and (3) from 0 to 20%, by weight, of one or more $C_2$–$C_4$ $\alpha$-olefins; the sums of components (1) to (3) and (a) and (b) amounting each to 100%, by weight.

7. Thermoplastic moulding compositions as claimed in claim 1 containing cellulose acetate, cellulose acetobutyrate, cellulose acetopropionate or mixtures thereof as the cellulose ester.

* * * * *